US012628054B2

(12) United States Patent　　(10) Patent No.: US 12,628,054 B2
Atawia　　(45) Date of Patent: May 12, 2026

(54) UPLINK AND CONTROL CHANNEL AWARE SKIP HANDOVER IN ADVANCED NETWORKS

(71) Applicant: Dell Products L.P., Round Rock, TX (US)

(72) Inventor: Ramy Atawia, Kanata (CA)

(73) Assignee: Dell Products L.P., Round Rock, TX (US)

( * ) Notice: Subject to any disclaimer, the term of this patent is extended or adjusted under 35 U.S.C. 154(b) by 629 days.

(21) Appl. No.: 17/935,745

(22) Filed: Sep. 27, 2022

(65) Prior Publication Data

US 2024/0107392 A1　　Mar. 28, 2024

(51) Int. Cl.
　　*H04W 36/00*　　(2009.01)
　　*H04W 36/30*　　(2009.01)
(52) U.S. Cl.
　　CPC ... *H04W 36/0072* (2013.01); *H04W 36/0094* (2013.01); *H04W 36/30* (2013.01)
(58) Field of Classification Search
　　CPC ......... H04W 36/0072; H04W 36/0094; H04W 36/30; H04W 36/0083; H04W 36/00835; H04W 36/00837; H04W 36/0085
　　See application file for complete search history.

(56) References Cited

U.S. PATENT DOCUMENTS

2015/0173024 A1　　6/2015　Seo et al.
2015/0304889 A1 *　10/2015　Qian ................... H04W 72/569
　　　　　　　　　　　　　　　　370/235
2017/0086107 A1　　3/2017　Hu et al.
2021/0160153 A1 *　5/2021　Akman ................. H04W 36/26
2021/0314104 A1 *　10/2021　Yin ....................... H04L 1/1861
2021/0321310 A1　　10/2021　Latheef et al.
2022/0248281 A1　　8/2022　Kim et al.
2022/0272590 A1　　8/2022　Uemura
　　　　　　　　(Continued)

OTHER PUBLICATIONS

Notification Concerning Transmittal of International Preliminary Report on Patentability mailed Apr. 10, 2025 for PCT Application No. PCT/US2023/033305, 16 pages.

(Continued)

*Primary Examiner* — Jae Y Lee
*Assistant Examiner* — Nhu Pham
(74) *Attorney, Agent, or Firm* — Amin, Turocy & Watson, LLP

(57)　　　　ABSTRACT

The technology described herein is directed towards skipping handover, particularly for ultra-reliable low latency communications (URLLC) devices, based on uplink conditions and other conditions such as control channel capacity and uplink channel performance (e.g., efficiency-related data. In one aspect, a controller monitors UEs, such as URLLC devices, and for each UE evaluates serving cell and neighbor cell data conditions. Based on the conditions, the controller decides whether to allow handover or skip handover. In another aspect, a UE is provided with conditional handover criteria, and the UE skips or starts a handover based on UE state data monitored at the UE with respect to the conditional handover criteria. In another aspect, machine learning can model the relation between the performance data used for handover skip decisions with respect to signal strength data to determine very optimal thresholds for handover skip decisions.

20 Claims, 13 Drawing Sheets

(56)     References Cited

U.S. PATENT DOCUMENTS

2023/0135073 A1\*   5/2023  Xu ................... H04W 36/00835
                                                                 370/331
2024/0196376 A1\*   6/2024  Wang .................... H04W 24/02

OTHER PUBLICATIONS

European Office Action mailed May 8, 2025 for European Patent Application No. 23793116.7, 3 pages.

Invitation to Pay Additional Fees mailed Jan. 18, 2024 for PCT Application No. PCT/US2023/033305, 17 pages.

Park Hyun-Seo et al: "Handover Mechanism in NR for Ultra-Reliable Low-Latency Communications", IEEE Network, vol. 32, No. 2, Mar. 2018, pp. 41-47.

Huawei et al: "Discussion on mobility for URLLC", 3GPP Draft; R2-167004, RAN WG2, Kaohsiung; Oct. 2016, [http://www.3gpp.org/ftp/Meetings_3GPP_SYNC/RAN2/Docs/] 4 pages.

International Search Report and Written Opinion mailed May 3, 2024 for PCT Application No. PCT/US2023/033305, 27 pages.

CATT: "Open issues of Conditional Handover", 3GPP Draft; R2-1903351, RAN WG2, Xi'an, China; Apr. 2019, [http://www.3gpp.org/ftp/tsg%5Fran/WG2%_5FRL2/TSGR2%5F105bis/Docs/R2%2D1903351%2Ez ip] 5 pages.

\* cited by examiner

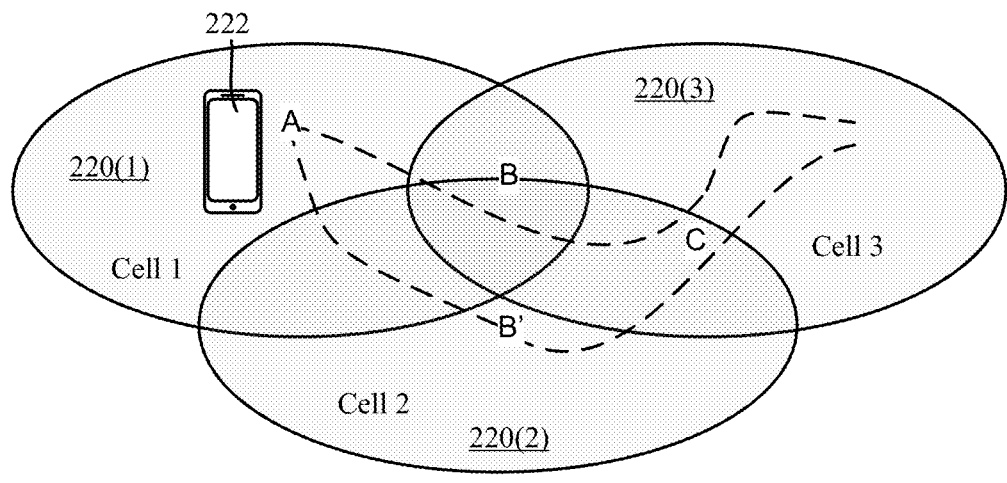
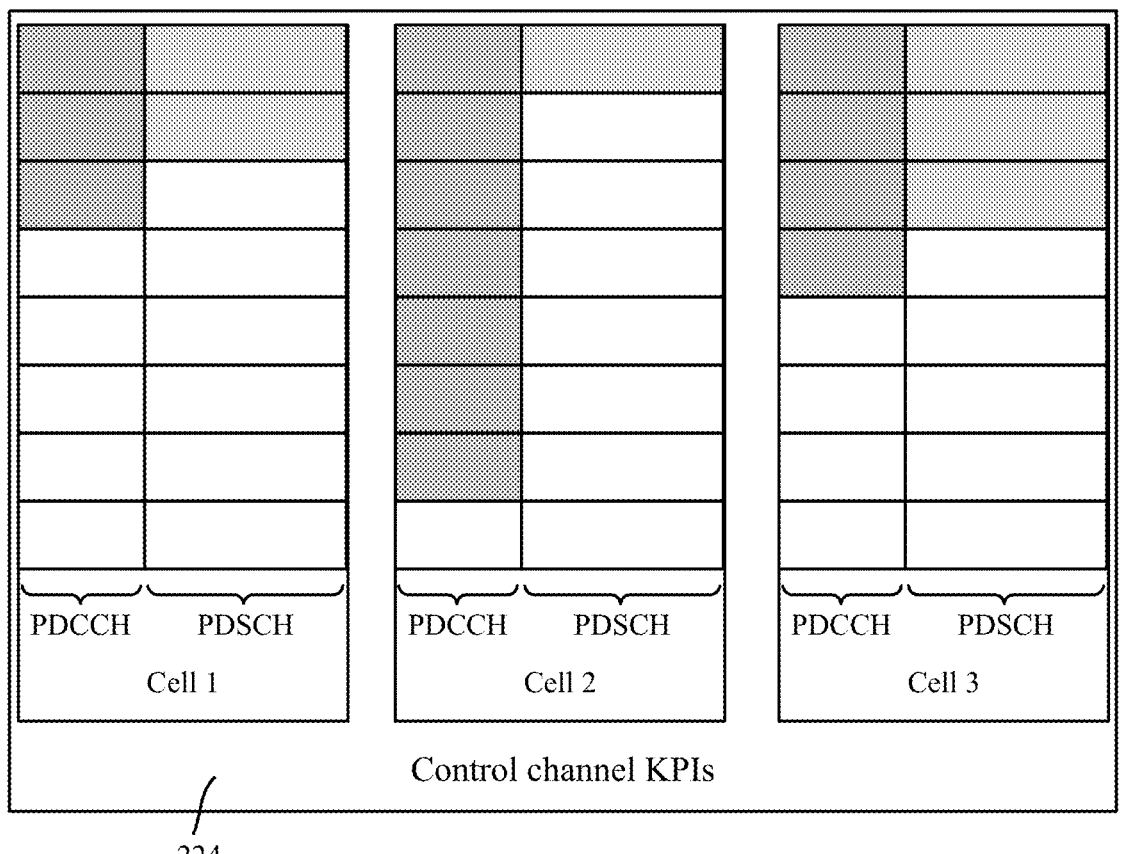
FIG. 2

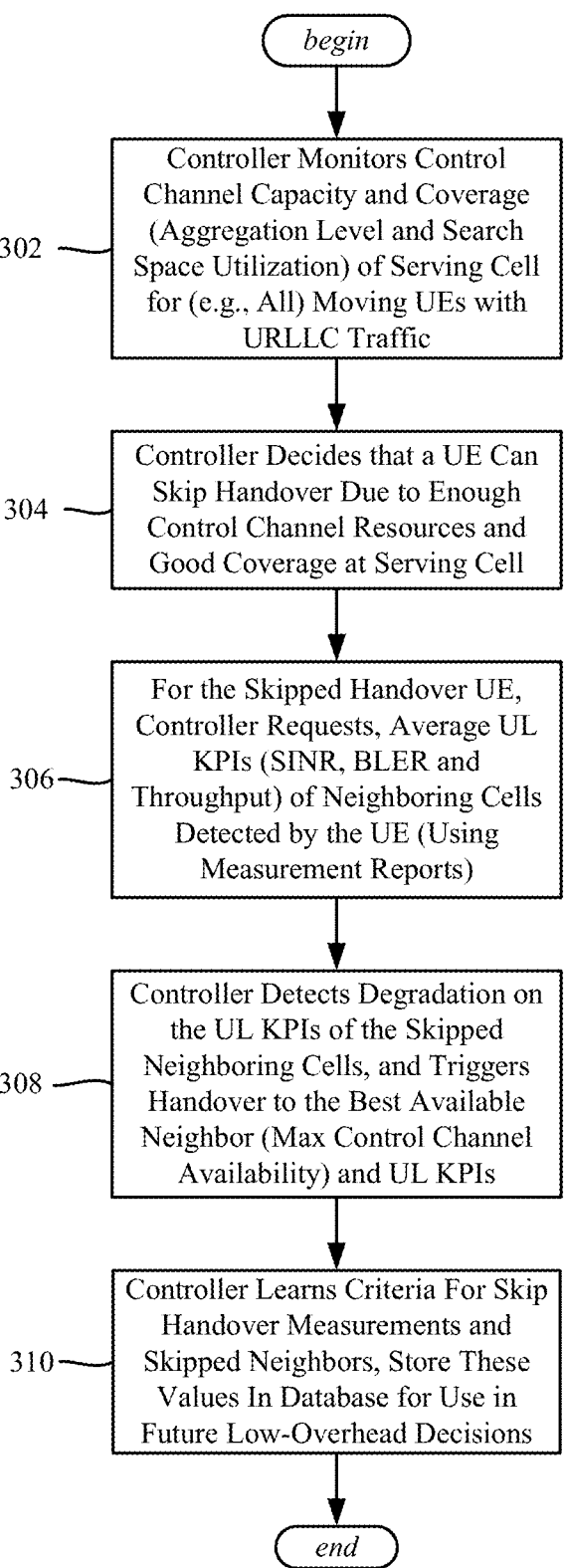

begin

302 — Controller Monitors Control Channel Capacity and Coverage (Aggregation Level and Search Space Utilization) of Serving Cell for (e.g., All) Moving UEs with URLLC Traffic 304 — Controller Decides that a UE Can Skip Handover Due to Enough Control Channel Resources and Good Coverage at Serving Cell 306 — For the Skipped Handover UE, Controller Requests, Average UL KPIs (SINR, BLER and Throughput) of Neighboring Cells Detected by the UE (Using Measurement Reports)

308 — Controller Detects Degradation on the UL KPIs of the Skipped Neighboring Cells, and Triggers Handover to the Best Available Neighbor (Max Control Channel Availability) and UL KPIs 310 — Controller Learns Criteria For Skip Handover Measurements and Skipped Neighbors, Store These Values In Database for Use in Future Low-Overhead Decisions end

FIG. 3

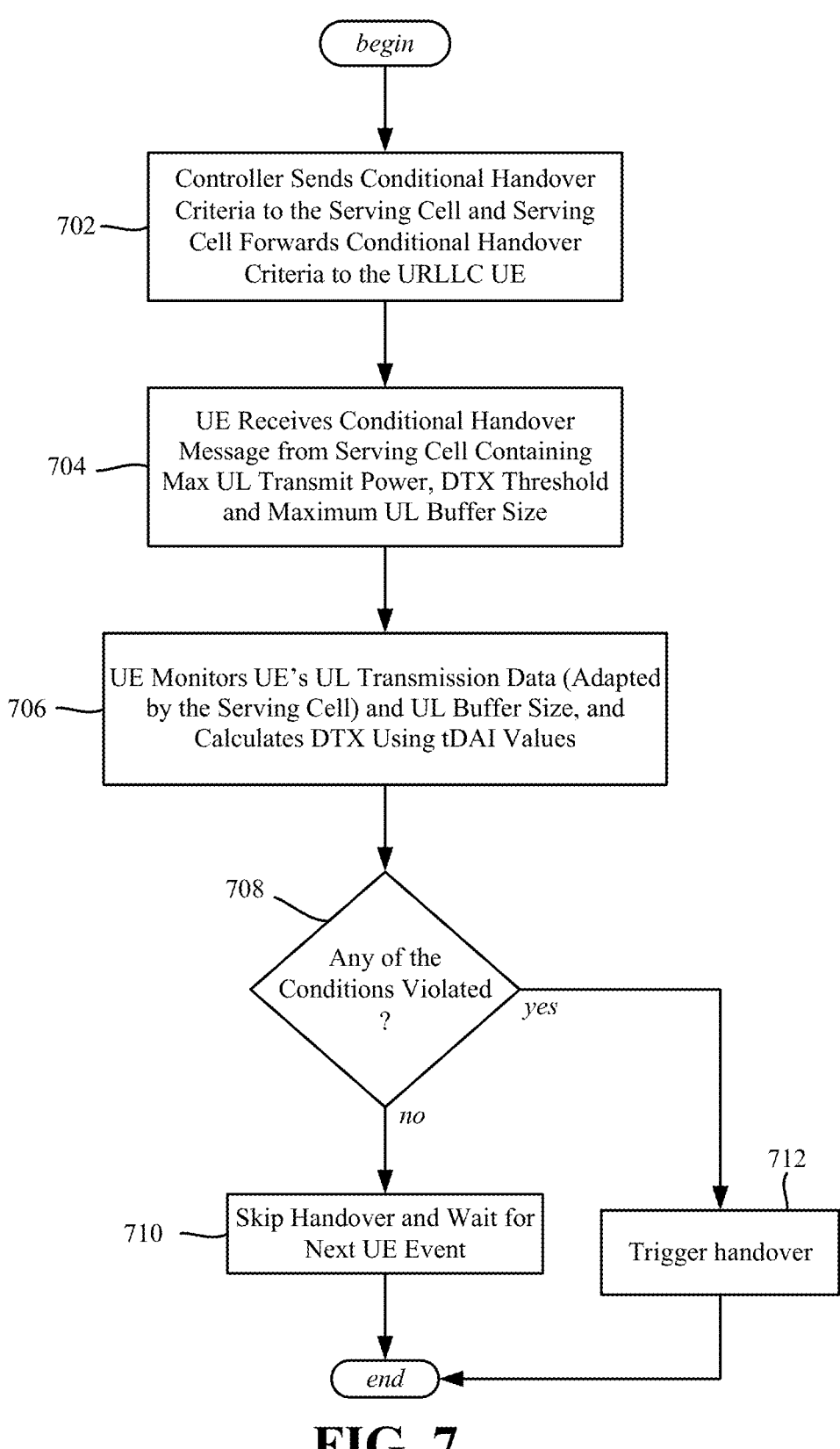

begin

702 — Controller Sends Conditional Handover Criteria to the Serving Cell and Serving Cell Forwards Conditional Handover Criteria to the URLLC UE 704 — UE Receives Conditional Handover Message from Serving Cell Containing Max UL Transmit Power, DTX Threshold and Maximum UL Buffer Size 706 — UE Monitors UE's UL Transmission Data (Adapted by the Serving Cell) and UL Buffer Size, and Calculates DTX Using tDAI Values 708 — Any of the Conditions Violated ?

yes no

710 — Skip Handover and Wait for Next UE Event

712 — Trigger handover end

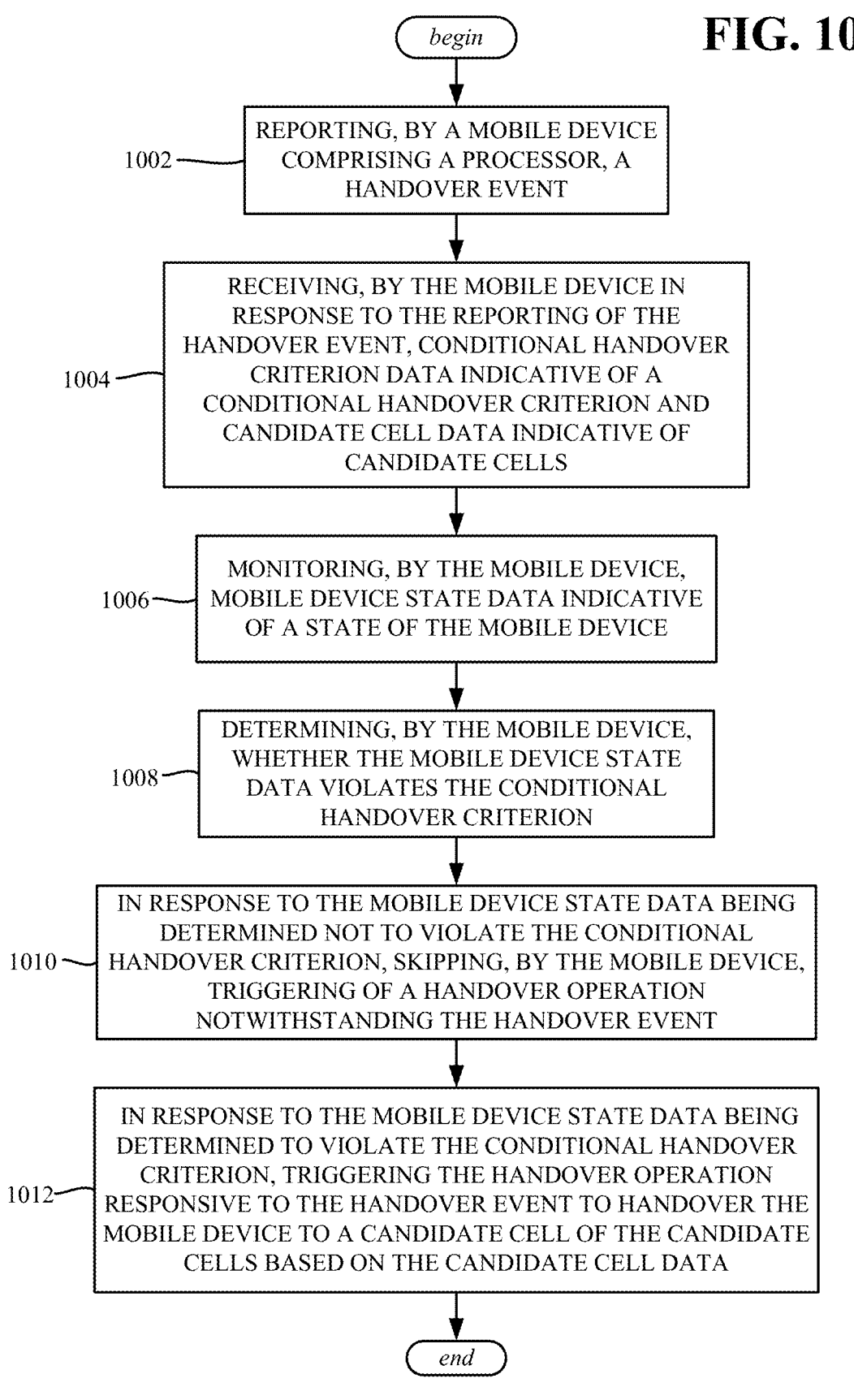

begin

1002 — REPORTING, BY A MOBILE DEVICE COMPRISING A PROCESSOR, A HANDOVER EVENT

1004 — RECEIVING, BY THE MOBILE DEVICE IN RESPONSE TO THE REPORTING OF THE HANDOVER EVENT, CONDITIONAL HANDOVER CRITERION DATA INDICATIVE OF A CONDITIONAL HANDOVER CRITERION AND CANDIDATE CELL DATA INDICATIVE OF CANDIDATE CELLS

1006 — MONITORING, BY THE MOBILE DEVICE, MOBILE DEVICE STATE DATA INDICATIVE OF A STATE OF THE MOBILE DEVICE

1008 — DETERMINING, BY THE MOBILE DEVICE, WHETHER THE MOBILE DEVICE STATE DATA VIOLATES THE CONDITIONAL HANDOVER CRITERION

1010 — IN RESPONSE TO THE MOBILE DEVICE STATE DATA BEING DETERMINED NOT TO VIOLATE THE CONDITIONAL HANDOVER CRITERION, SKIPPING, BY THE MOBILE DEVICE, TRIGGERING OF A HANDOVER OPERATION NOTWITHSTANDING THE HANDOVER EVENT

1012 — IN RESPONSE TO THE MOBILE DEVICE STATE DATA BEING DETERMINED TO VIOLATE THE CONDITIONAL HANDOVER CRITERION, TRIGGERING THE HANDOVER OPERATION RESPONSIVE TO THE HANDOVER EVENT TO HANDOVER THE MOBILE DEVICE TO A CANDIDATE CELL OF THE CANDIDATE CELLS BASED ON THE CANDIDATE CELL DATA end

UPLINK AND CONTROL CHANNEL AWARE SKIP HANDOVER IN ADVANCED NETWORKS

BACKGROUND

Ultra-reliable low latency communications (URLLC) are required to have a very low packet drop rate (e.g., <0.0001) as well as being bounded by a short end-to-end delay (e.g., less than one millisecond latency). In order to meet such challenging requirements during mobility, an advanced new radio (e.g., fifth generation, or '5G', and beyond) network typically triggers handovers to ensure that the URLLC device is connected to the best serving cell.

However, URLLC handover results in significant network overhead (often comparable to the URLLC traffic load) which deteriorates the network key performance indicators (KPIs, e.g., spectral efficiency). The network densification in private 5G and beyond 5G (B5G) will further increase such overhead, to the point where it can make the handover gains insignificant. In addition, handover is always associated with the risk of connection interruption due to switching the data connection path from the core network to the RAN or within RAN (between the different central units, which might be managed by different vendors). This can cause momentary packet drops and thereby violate the URLLC quality of service (QoS) requirements, especially with respect to very high mobility scenarios anticipated in private 5G networks (e.g., mobile robots and drones).

BRIEF DESCRIPTION OF THE DRAWINGS

The technology described herein is illustrated by way of example and not limited in the accompanying figures in which like reference numerals indicate similar elements and in which:

FIG. 2 is an example representation of a mobile device path through multiple cells, along with control channel performance indicators for each cell, which can be used to determine handover or handover skip, in accordance with various aspects and implementations of the subject disclosure.

FIG. 3 is an example flow diagram showing example operations related to achieving uplink-aware and physical downlink control channel (PDCCH)-aware skip handover, in accordance with various aspects and implementations of the subject disclosure.

FIG. 7 is an example flow diagram showing example operations related to conditionally skipping or triggering mobile device handover based on uplink performance indicators, in accordance with various aspects and implementations of the subject disclosure.

FIG. 10 is a flow diagram showing example operations related to a user equipment obtaining and using conditional handover criterion data to make a handover decision, in accordance with various aspects and implementations of the subject disclosure.

DETAILED DESCRIPTION

Figure 1:
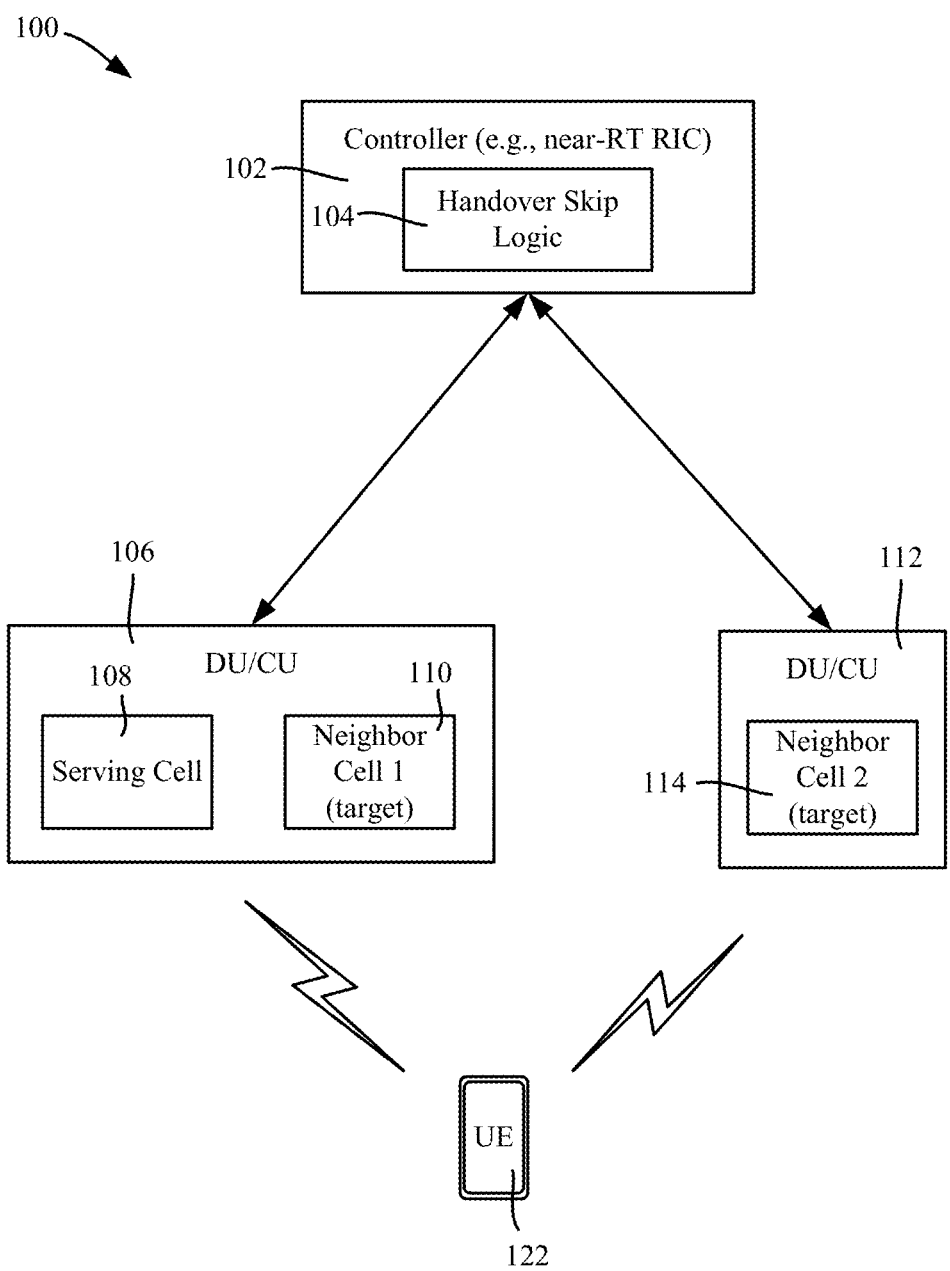
FIG. 1 is a block diagram representation of a system of example components by which handover can be skipped when appropriate, in accordance with various aspects and implementations of the subject disclosure.

Various aspects of the technology described herein are generally directed towards determining handover operations based on condition data, including for ultra-reliability, low latency communications (URLLC) device data traffic. As will be understood, the technology described herein operates to balance the tradeoff between network overhead and risk of interruption via a handover, versus spectral efficiency considerations from skipping a handover.

In general, the concept of "skip handover" or bypassing a handover (versus triggering, initiating or performing the handover) is based on evaluating measured uplink performance and control channel key performance indicators (KPIs), which better suits the stringent delay and energy requirements of URLLC devices. Aspects of the technology are based on network-wide uplink efficiency aware data.

In one implementation, the uplink efficiency is regularly (e.g., basically continuously, or repeatedly) measured, including for example, signal-to-interference plus noise ratio (SINR) of the current serving cell and the neighbor cells detected by a user equipment (or a user equipment device, mobile device, or user device) as candidates for handover. Handover is triggered to a neighboring cell (e.g., highest impacted) to avoid excessive network-wide uplink interference and to reduce the consumption of user equipment power. Note that this is unlike existing approaches which focus solely on downlink coverage/capacity and thus force a user equipment that is skipping handover to transmit high power levels to compensate for the uplink path loss.

Further, the handover or skip handover determination is a control channel-aware decision, in which the neighboring and serving cells are evaluated based on their control channel performance, including coverage and capacity. In general, a handover to a neighboring cell is skipped if the current serving cell has enough control channel resources to transmit the (e.g., URLLC) traffic without violating the packet delay budget. In addition, only neighbors with enough PDCCH (physical downlink control channel) capacity to meet the packet delay budget are considered when a handover is deemed appropriate. Note that this is unlike existing approaches that trigger handover towards a neighbor with better reference signal received power (RSRP) or reference signal received quality (RSRQ), even though the shared channel of both the serving and neighboring cells may be providing similar spectral efficiency.

It should be understood that any of the examples herein are non-limiting. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a system 100 including a controller component 102 that includes handover skip logic 104 by which intelligent handover decisions are made as described herein. The example system of FIG. 1 shows the controller 102 coupled to a first distributed unit/centralized unit (DU/CU) 106, which includes the current serving cell 108 and a neighbor cell 1 (target) 110, and a second distributed unit/centralized unit (DU/CU) 112, which includes a neighbor cell 2 (target) 114. Note that the controller 102 can be a radio access network (RAN) intelligent controller (RIC, e.g., near real time) so as to be O-RAN compliant, to exchange the control channel and uplink information for inter-cell UL coordination as generally depicted in FIG. 1. The technology can alternatively leverage inter-cell UL coordination directly over the Xn interface, e.g., via distributed handover skip logic.

Also shown in FIG. 1 is a user equipment device 122, also referred to herein as a mobile device, communicating via the serving cell 108, and receiving signals from (at least) the neighboring cells 110 and 114 in this example. The UE device 122 can be one type of any number of (e.g., URLLC) devices, including, but not limited to medical-related devices, vehicles, sensors, small measuring devices and so forth, which can be moving at relatively high speeds, e.g., on drones, mobile robots and so forth.

As will be understood, the handover skip logic 104 determines whether to handover from the serving cell 108 to one of the neighbor cells 110 or 114 based on measured or otherwise obtained performance indicators. While only two neighboring cells are shown as candidates for handover in the straightforward example of FIG. 1, it is understood that any practical number of such neighbor cells may be present for a mobile device at any given time, including any practical number coupled to the first distributed unit/centralized unit (DU/CU) 106 and the second distributed unit/centralized unit (DU/CU) 112.

Note that in existing handover solutions, the serving cell monitors the received UE measurement reports and compares the RSRP, for example, between the current and neighboring cells. The network then waits for a certain time to ensure that the best neighbor (candidate as a new serving cell) maintains a higher signal strength and quality compared to the current serving cell, and then triggers handover. Current approaches optimize the thresholds based on downlink signal strength, which may not be the actual bottleneck for satisfying URLLC traffic, including for battery-constrained UEs. In addition, the threshold is determined cell-wide (i.e., same value used by all UEs) and thus does not capture the different mobility models of the users and their experienced channel conditions. Still further, existing handover technology relies on UE measurements, which increases UE power consumption and impacts the performance (e.g., causes higher packet delay) due to periodic measurement gaps in multi-carrier scenarios.

Further note that a recent approach was introduced for dense 5G deployments, in which handover is not triggered towards the first-tier neighboring cells if they do not provide a significant enhancement in downlink signal strength. The current skip handover approaches are either distance or cell size based.

The existing approach of distance-based handover skips handover to nearby cells because their downlink signal strength gains are marginal. The decisions, however, are suboptimal because the signal quality of the serving and neighboring cells depend on many other factors (besides distance), such as shadowing, building material and the load-based interference from the surrounding cells. The existing approach of cell size-aware handover skipping skips handover for small size base stations (i.e., small downlink service region). However, such small cells may be operating on the same uplink frequency used by a UE that is skipping handover and transmitting with high power, thus causing interference which further shrinks the service region of such small cells, causing network coverage gaps.

To summarize, existing approaches either perform handover to first-tier neighbors based on downlink signal strength, or skip handover based on inter-site distance and cell size. The former reduces the handover gains, such as when the control resources or uplink channels are the actual bottleneck in URLLC traffic, while the latter can result in excessive interference to skipped neighbors.

Turning to the handover skip technology described herein, FIG. 2 shows an example representation of three cells, Cell 1-Cell 3, respectively labeled 220(1)-220(3). In this example, a mobile device 222 (user equipment, or UE) can traverse the cells 220(1)-220(3) via one of the dashed paths, (A-B-C) or (A-B'-C). The cells 220(1)-220(3) can be communicating on the same frequency.

Considering first the path A-B'-C, existing approaches often can make the UE skip handover to the Cell 2 220(2)

and stay connected to Cell 1 220(2) until reaching point C. As a result, the UE 220 generates large uplink interference when in cell 2 at point B' (because of close proximity to the generally cell-centered radio of the Cell 2 220(2)). With respect to the path A-B-C, existing approaches may handover the UE 222 to the Cell 2 220(2) because of better RSRP or RSRQ, incurring the handover overhead and risk of interruption, even though Cell A's RSRP or RSRQ is adequate.

In contrast, the technology described herein measures the uplink interference on the Cell 2 220(2) (in both paths) with respect to skip handover, e.g., based on uplink KPIs and UE energy considerations. As a result, the controller will skip handover to the Cell 2 220(2) if the UE takes path A-B-C, but will perform handover if the UE takes path A-B'-C, to avoid causing too much uplink interference.

As a further example shown in FIG. 2, the controller 102 (FIG. 1) also can determine handover based on the uplink traffic in the Cell 2 220(2). Note that URLLC typically requires more control (PDCCH) than data/shared (PDSCH, or physical downlink shared channel) resources; and whereby PDCCH can be a bottleneck (for example, consider a device that only needs to send some small amount of data such as measured temperature or current location coordinates). Existing approaches focused solely on the PDSCH coverage and capacity for handover criteria (e.g., neighbor selection), which results in handover to the Cell 2 220(2), which as shown in the control channel KPIs by the unshaded blocks in the KPIs of the Cell 2, has mostly vacant PDSCH traffic.

In contrast, the technology described herein considers the control channel capacity and coverage on both the current serving cell and the candidate neighbors for handover. Thus, as depicted in FIG. 2 via the sets of control channel KPIs 224, (in which unshaded blocks represent available resources), the skip handover logic 104 (FIG. 1) will likely decide to skip the handover to the Cell 2 220(2) because of the congested PDCCH condition, as shown via the shaded (occupied) blocks in the KPIs of the Cell 2. The congested PDCCH condition versus non-congested can be determined based on a threshold value (e.g., a threshold percentage, which can vary based on device requirements) comparison, for example. It is also feasible to choose a neighbor based on least congested PDCCH resources.

FIG. 3 shows a general overview of example operations that can be taken by the controller's skip handover logic 104 (FIG. 1) to achieve an uplink-aware and PDCCH-aware skip handover. In one embodiment, (e.g., FIGS. 4 and 5) the data/KPI collected by the controller include uplink SINR data, CCE (control channel element) utilization data and PDCCH discontinuous transmission (DTX) data.

In one step, the (e.g., URLLC) traffic with potential skip handover is identified by one or a combination of packet size and inter-arrival rate, the number of resource blocks needed for scheduling PDSCH, and/or the specified delay requirements defined in the 5G quality-of-service (QoS) identifier (5QI).

The control channel capacity and coverage are monitored by the CCE utilization data and PDCCH discontinuous transmission (DTX) data KPIs. The CCE utilization data is determined from the total number of resource elements (REs) used for PDCCH, divided by the total number of available REs in the UE search space. DTX occasions at maximum aggregation level are defined as the percentage of downlink transmissions in which the network identifies that the UE did not correctly decode the PDCCH (and the initial transmission was using the maximum aggregation level).

The uplink KPIs can include uplink SINR, defined as the total signal power divided by the interference power, and/or uplink UL block error rate (BLER), which is the ratio between PUSCH (physical uplink shared channel) occasions that were not correctly decoded by the network to the total number.

Via the KPIs, in FIG. 3, operation 302 the controller monitors control channel capacity and coverage (aggregation level and search space utilization) of the serving cell for all the moving UEs with (e.g., URLLC) traffic. At operation 304, the controller decides that a UE can skip handover due to enough control channel resources and good coverage at the serving cell.

For a skipped handover UE, at operation 306 the controller requests average uplink KPIs (SINR, BLER and throughput) of all neighboring cells detected by the UE (using measurement reports). If, at operation 308 the controller detects a degradation on the UL KPIs of the skipped neighboring cells, the controller triggers handover to the best available neighbor based on maximum control channel availability and/or the uplink KPIs.

At operation 308, the controller maintains (for learning) the criteria for skip handover measurements and skipped neighbors. The values can be stored in a data store and used for future low-overhead skip handover decisions.

Figure 4:
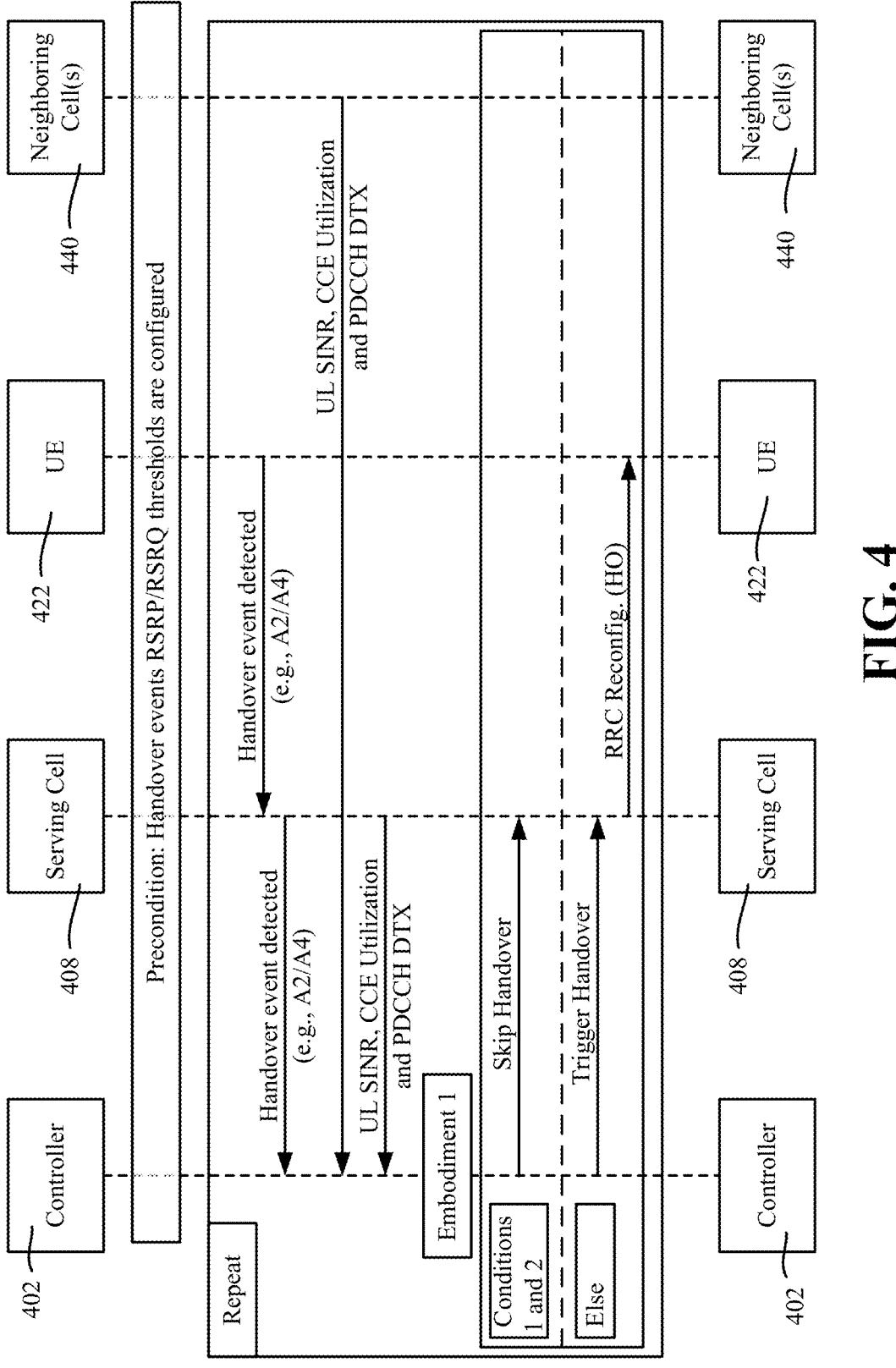
FIG. 4 is an example component and signaling diagram showing example dataflow sequences related to conditionally skipping or triggering mobile device handover, in accordance with various aspects and implementations of the subject disclosure.
Figure 5:
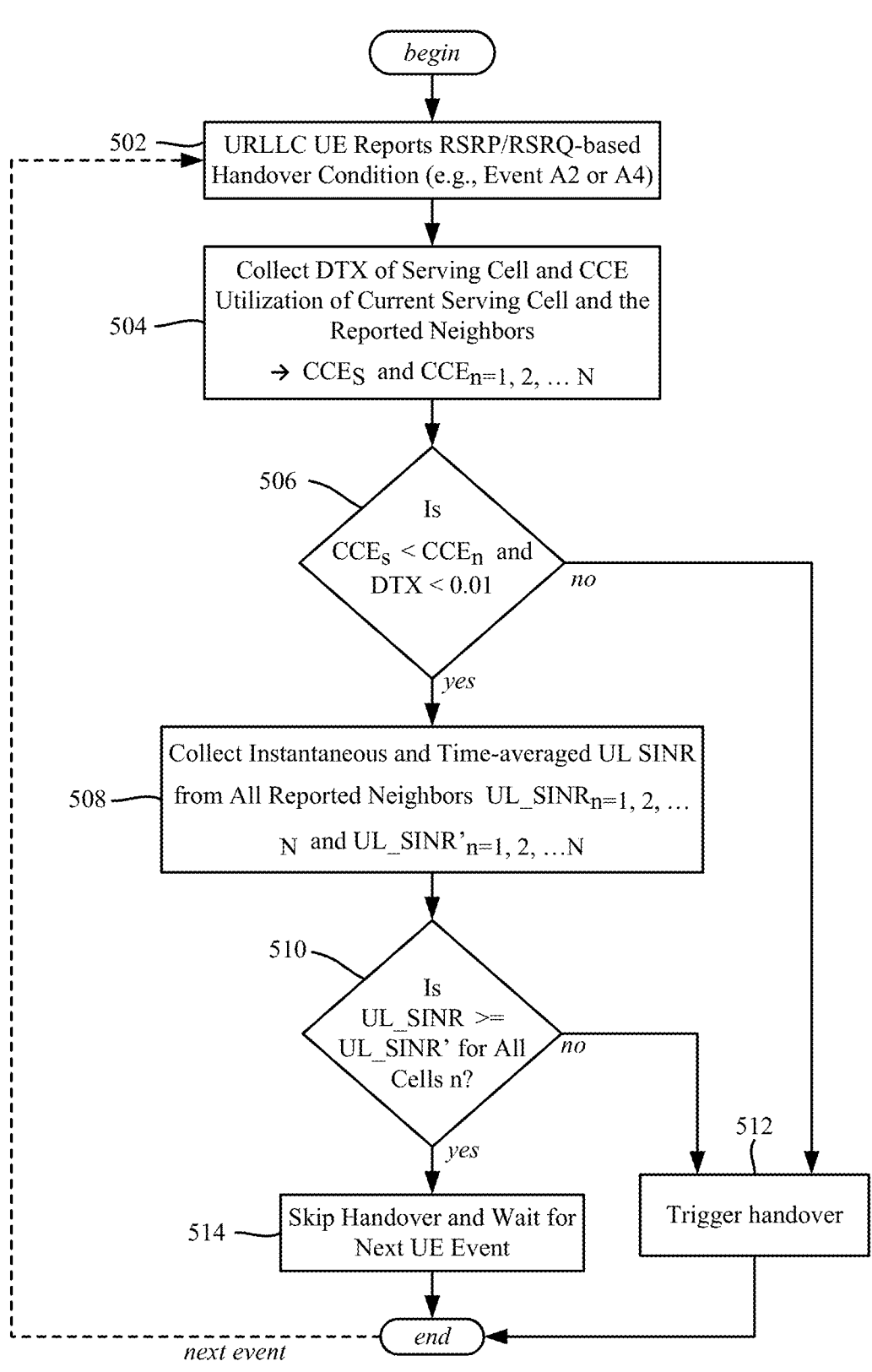
FIG. 5 is an example flow diagram showing example operations related to conditionally skipping or triggering mobile device handover, in accordance with various aspects and implementations of the subject disclosure.

FIGS. 4 and 5 provide additional details of a first embodiment which a controller (e.g., incorporated as handover skip logic into the O-RAN compliant RIC) decides on whether to skip handover based on uplink and PDCCH awareness, in contrast to proprietary RSRP/RSRQ handover decisions in the RAN. This first embodiment is based on 3GPP event-based handover events, e.g., A2 or A4 events.

As shown in FIG. 4 via the arrow from the UE 422 to the serving cell 408, and the arrow from the serving cell 408 to the controller 402, an existing 3GPP handover event (e.g., A2 or A4) is used to trigger the uplink-aware and control channel-aware skip handover. This is also shown via operation 502 of FIG. 5. Examples of such A2 or A4 events include when the serving cell RSRP/RSRQ is below a threshold value, or when the neighbor's RSRP/RSRQ becomes better than a threshold value.

As shown in FIG. 4 via the arrow from the neighboring cell(s) 440 to the controller 402, and the arrow from the serving cell 408 to the controller 402, the controller 402 collects the PDCCH discontinuous transmission (DTX) data of the current cell to ensure that it is lower than a certain threshold (e.g., 1%) that secures the coverage needed to maintain the reliability KPI; (note that the uplink SINR data is also collected from the neighboring cells 440 and the serving cell 408). In addition to checking the DTX data, the CCE utilization is collected and checked to ensure that the serving cell has better control channel utilization to schedule the URLLC data which is needed to satisfy the delay requirements. These conditions are evaluated at operation 506, in which the CCE utilization of the serving cell CCEs needs to be less than the CCE utilization of the reported neighbor cells $CCE_n$ (where n=1, 2, . . . N). As shown in FIG. 5, if both conditions are met, handover is not yet performed, while if not met, handover is triggered via operation 512, e.g., via the trigger handover message from the controller 402 to the serving cell 408 shown in FIG. 4.

If handover is not triggered based on the evaluation at operation 506, a further condition is checked, which is based on the instantaneous uplink SINR obtained from the neighboring cells reported in the UE measurement report (e.g., at operation 508). At operation 510, this SINR data is compared against the time-averaged value (prior the UE going into the coverage region of such cell). If the instantaneous value is greater than or equal to the time-averaged uplink SINR value, then the UE device with a potential skipping handover will have a minimal impact on the uplink coverage of skipped neighbors, otherwise handover is triggered, e.g., via the trigger handover message from the controller 402 to the serving cell 408 shown in FIG. 4.

If the above conditions are each satisfied, then the UE can skip handover (e.g., no handover command/a skip handover message is issued) at operation 514. Otherwise, handover is to the best neighbor (e.g., that satisfied A2 or A4), via the handover command to the serving cell, resulting in the serving cell providing the UE with radio resource control reconfiguration data. It should be noted that the order of some of the example operations in FIG. 5 can vary, e.g., operations 508 and 510 can be performed before operation 506, operations 504 and 508 can be combined (e.g., as in FIG. 4) and so on.

In a more particular example, inter-cell UL coordination directly over Xn interface or via O-RAN controller such as RIC are based on the exchange of the control channel and uplink information. The CU will wait for a handover trigger command, e.g., the RIC can utilize the INSERT function defined in O-RAN E2SM (service model) in which the CU, upon receiving a handover event from the UE, holds on the decision until receiving the RIC recommendations.

Figure 6:
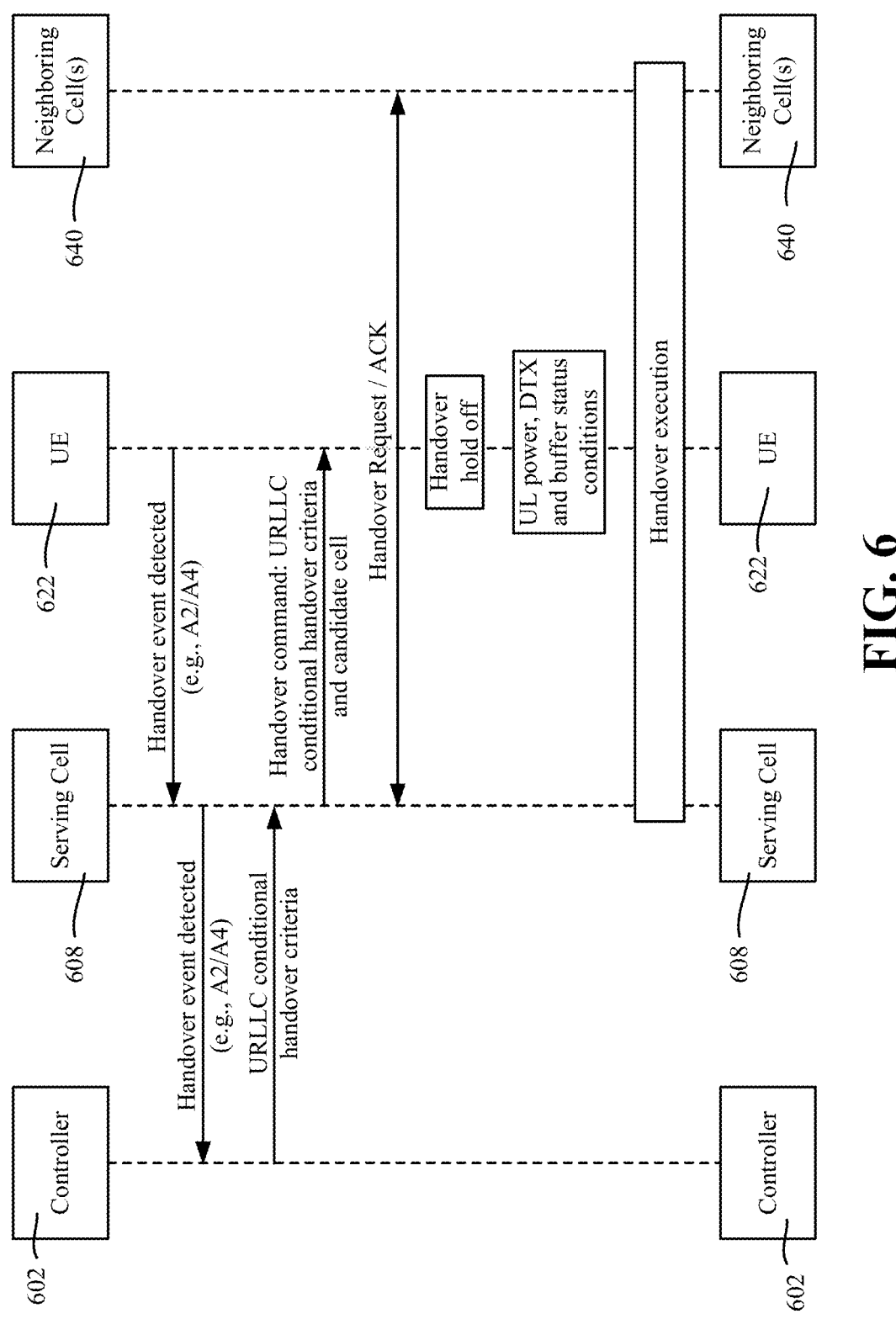
FIG. 6 is an example component and signaling diagram showing example dataflow sequences related to conditionally skipping or triggering mobile device handover based on uplink performance indicators, in accordance with various aspects and implementations of the subject disclosure.

Turning to a second embodiment generally represented in FIGS. 6 and 7, conditional handover for neighbor skipping is based on providing conditional handover criteria to the user equipment. In general, the UE is given conditional handover criteria and candidate cell data (one or possibly more than one candidate cell), the UE monitors its current state/condition data with respect to the conditional handover criteria, and the UE starts execution of the handover to the candidate cell if the UE's state data/conditions warrant doing so. This concept extends 3GPP conditional handover based on including the skip handover criteria (uplink and PDCCH awareness) at the UE, which thus saves measurements and signaling overhead while the UE is skipping neighbors.

Thus, upon detection of a handover event, shown via the arrow from the UE 622 to the serving cell 608, and the arrow from the serving cell 608 to the controller 602, an existing 3GPP handover event (e.g., A2 or A4) is used to start the process. In this second embodiment, the controller 602 determines the conditional handover criteria (e.g., threshold conditions and the like as described herein), and communicates the conditional handover criteria to the serving cell 608, which in turn communicates the conditional handover criterion data to the UE 622. This is also shown via operations 702 and 704 of FIG. 7.

In this example embodiment, the conditional handover data is based on the following KPIs available at the UE (unlike the cell KPIs used in the prior embodiment), namely:

Uplink transmit power (ULtx), to reflect the pathloss due to skipping handover and to maintain a distant connection to the serving cell. Basically, this is proportional to the uplink SINR measured by the serving cell (used in embodiment 1) to compensate for excessive interference. Thus, the UE can potentially skip handover if the Ultx is less than a predefined maximum threshold.

Total downlink assignment index (tDAI) indicated in the PDCCH and includes the total number of transmitted downlink slots prior to sending the HARQ feedback. If the tDAI does not match the number of PDCCH correctly received by the UE, then a DTX count at the UE is increased, e.g., incremented. If the DTX count at the UE is does not violate a certain threshold value, e.g., 1%, then the handover potentially can be skipped.

Further, the PDCCH capacity of the serving cell is reflected by the UL buffer size available at the UE. A small buffer size indicates that the serving cell has enough PDCCH resources to schedule the URLLC traffic on time (after receiving scheduling requests from the UE). Thus, the current cell can continue to serve the UE.

These condition-related data are monitored by the UE at operation 706 of FIG. 7. If any of the conditions (uplink power, DTX and buffer status conditions) are violated as determined at operation 708, handover is triggered at operation 712, otherwise handover is skipped (operation 710). Note that as shown in FIG. 6, the UE receives the candidate handover cell data is known to the UE, e.g., as passed by the serving cell 608 in conjunction with the conditional handover criteria. Also note that it is feasible for the conditional handover criteria to remain the same, and the serving cell change only the candidate cell if handover to the previous candidate cell was skipped.

Figure 8A:
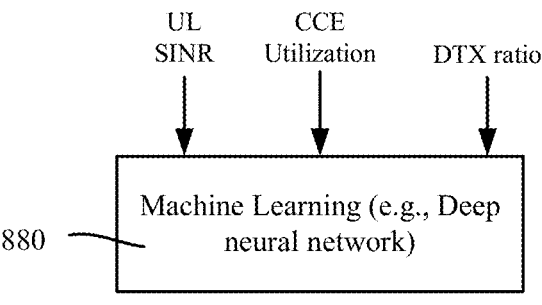
FIG. 8A is an example representation of learning handover decision thresholds, in accordance with various aspects and implementations of the subject disclosure.

A third embodiment supports the technology described herein on legacy UEs and RAN nodes by adapting the RSRP and RSRQ thresholds, which forces the UE to skip neighbors with low control channel capacity or those that cannot tolerate the UL interference. As shown in FIG. 8A, this is achieved through machine learning, to capture the time-varying control resource usage and uplink conditions of the neighbors.

In this embodiment, the controller attempts to further minimize the signaling and measurement overhead by the UE and the network by operating to better optimize the thresholds of handover events (e.g., the A2 threshold) to reflect the skipping handover strategy. This third embodiment allows skip handover for legacy UEs that do not support conditional handover (embodiment 2) and/or a CU that does not support the RIC INSERT function or the like (embodiment 1). In general, the conditions for handover are highly likely to be met based on the learned/likely most optimal threshold values.

Figure 8B:
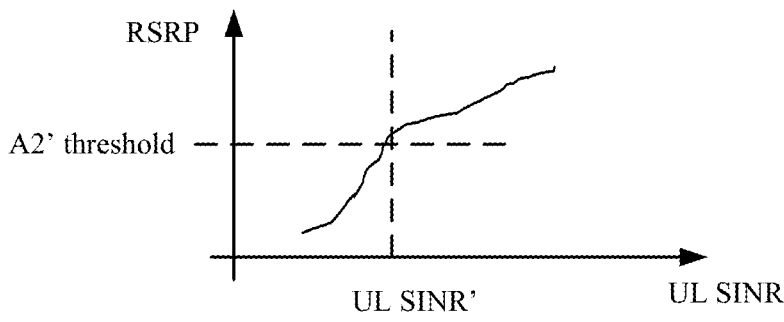
FIGS. 8B-8D are example graphical representations of adapting event thresholds and neighbor data for handover skipping decisions, in accordance with various aspects and implementations of the subject disclosure.
Figure 8C:
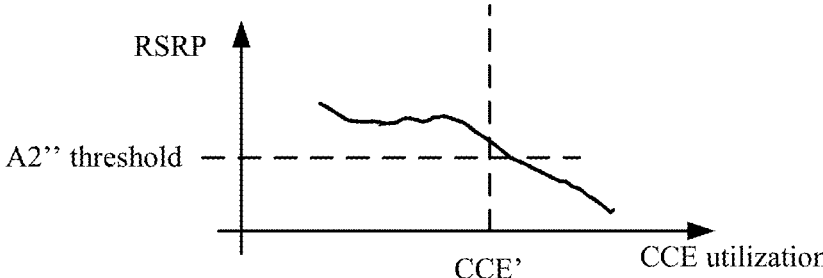
Figure 8D:
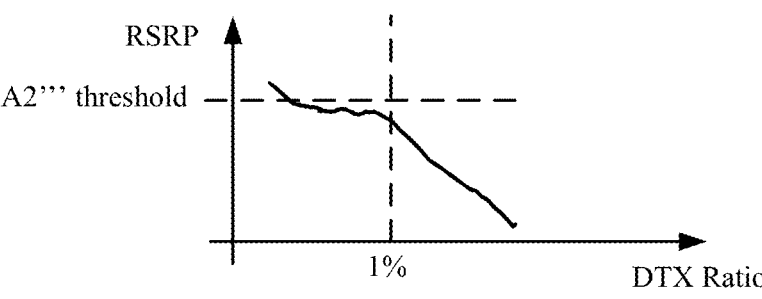

In one implementation, machine learning (e.g., via a neural network) models the relations between the KPIs used for skipping handover (UL SINR, CCE utilization and DTX ratio) and the RSRP or RSRQ, which is measured by legacy UEs and CUs while evaluating the neighbors and taking handover decisions. In the examples of FIGS. 8B, 8C and 8D, the value of RSRP at the threshold for each KPI will be used as the A2 threshold configured for the UE (e.g., A2=min (A2', A2" and A2")).

Figure 9:
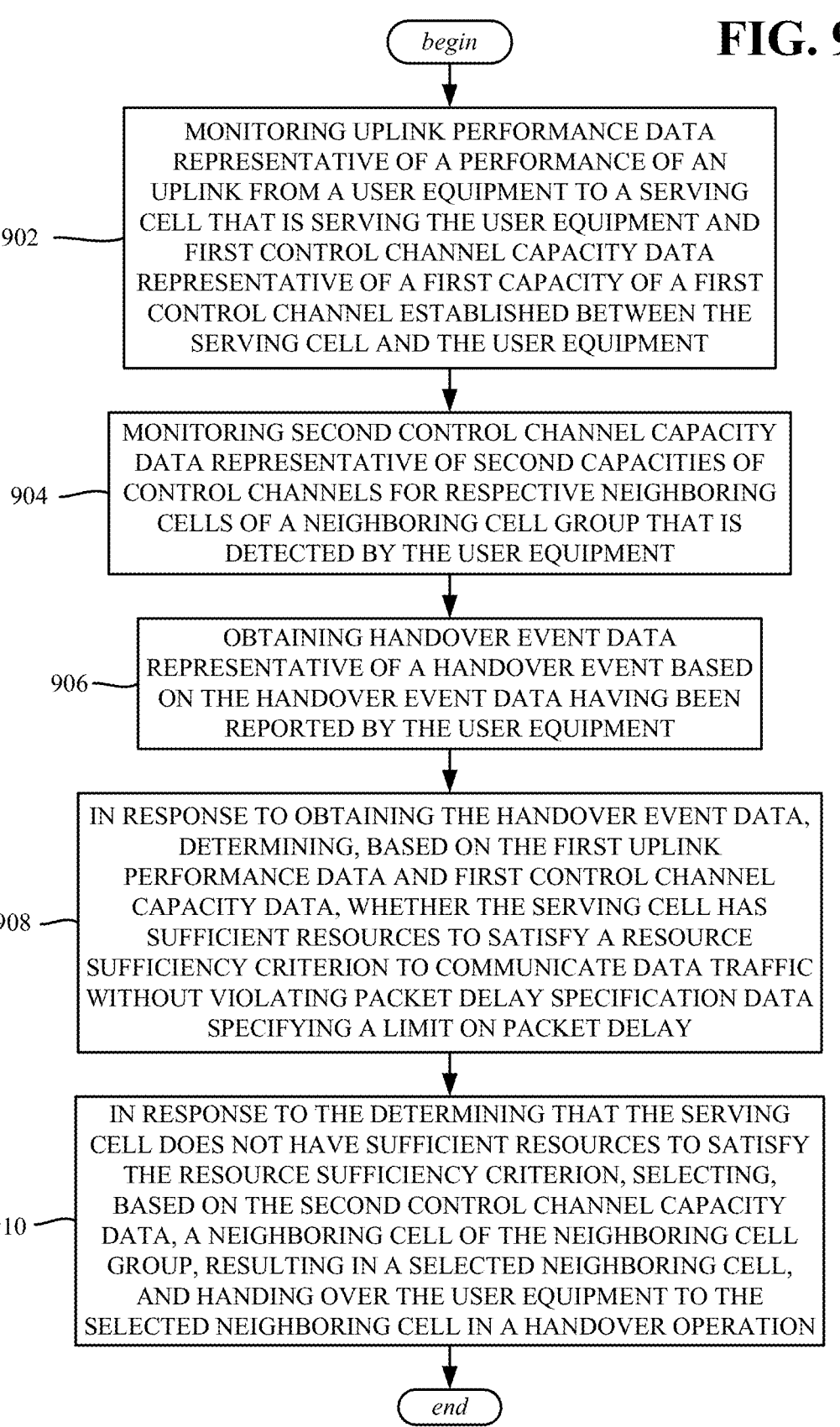
FIG. 9 is a flow diagram showing example operations related to determining whether to skip handover of a user equipment based on various data including uplink-related data, in accordance with various aspects and implementations of the subject disclosure.

One or more aspects can be embodied in network equipment, such as represented in the example operations of FIG. 9, and for example can include a memory that stores computer executable components and/or operations, and a processor that executes computer executable components and/or operations stored in the memory. Example operations can include operation 902, which represents monitoring uplink performance data representative of a performance of an uplink from a user equipment to a serving cell that is serving the user equipment and first control channel capacity data representative of a first capacity of a first control channel established between the serving cell and the user equipment. Example operation 904 represents monitoring second control channel capacity data representative of second capacities of control channels for respective neighboring cells of a neighboring cell group that is detected by the user equipment. Example operation 906 represents obtaining handover event data representative of a handover event based on the handover event data having been reported by the user equipment. Example operation 908 represents, in response to obtaining the handover event data, determining, based on the first uplink performance data and first control channel capacity data, whether the serving cell has sufficient resources to satisfy a resource sufficiency criterion to communicate data traffic without violating packet delay specification data specifying a limit on packet delay. Example operation 910 represents, in response to the determining that the serving cell does not have sufficient resources to satisfy the resource sufficiency criterion, selecting, based on the second control channel capacity data, a neighboring cell of the neighboring cell group, resulting in a selected neighboring cell, and handing over the user equipment to the selected neighboring cell in a handover operation.

The user equipment can include an ultra-reliable low latency communications device.

The network equipment can include a radio access network intelligent controller.

Further operations can include, in response to the determining that the serving cell has sufficient resources to satisfy the resource sufficiency criterion, obtaining instantaneous uplink signal interference plus noise ratio data representative of instantaneous uplink signal interference plus noise ratios determined for the respective neighboring cells of the neighboring cell group, obtaining time-averaged uplink signal interference plus noise ratio data representative of time-averaged uplink signal interference plus noise ratios determined for the respective neighbor cells of the neighboring cell group, determining whether the instantaneous uplink signal interference plus noise ratio data of the respective neighbor cells of the neighboring cell group are equal to or greater than the time-averaged uplink signal interference plus noise ratio data of the respective neighbor cells, and, in response to the instantaneous uplink signal interference plus noise ratio data of the respective neighbor cells of the neighboring cell group being determined to be greater than or equal to the time-averaged uplink signal interference plus noise ratio data of the respective neighbor cells, maintain a connection the serving cell without performing the handover operation, and, in response to the instantaneous uplink signal interference plus noise ratio data of the respective neighbor cells of the neighboring cell group being determined to be less than the time-averaged uplink signal interference plus noise ratio data of the respective neighbor cells, performing the selecting of the neighboring cell and the handing over of the user equipment to the selected neighboring cell in the handover operation.

The first control channel capacity data can include physical downlink control channel discontinuous transmission data representative of physical downlink control channel discontinuous transmission of the serving cell, and determining whether the serving cell has sufficient resources to satisfy the resource sufficiency criterion can include determining whether the physical downlink control channel discontinuous transmission data satisfies a reliability threshold value associated with a reliability criterion.

The first control channel capacity data can include first control channel element utilization data representative of a utilization of an element of the first control channel between the user equipment and the serving cell, the second control channel capacity data can include second control channel element utilization data representative of respective utilizations of elements of the second control channels of the respective neighboring cells of the neighboring cell group, and the determining whether the serving cell has sufficient resources to satisfy the resource sufficiency criterion can include determining whether the first channel element utilization data satisfies a defined function with respect to the second channel element utilization data.

The first control channel capacity data can include physical downlink control channel discontinuous transmission data representative of physical downlink control channel discontinuous transmission of the serving cell and first control channel element utilization data representative of a utilization of an element of the first control channel between the user equipment and the serving cell, the second control channel capacity data can include second control channel element utilization data representative of respective utilizations of elements of the second control channels of the respective neighboring cells of the neighboring cell group, and determining whether the serving cell has sufficient resources to satisfy the resource sufficiency criterion can include determining whether the physical downlink control channel discontinuous transmission data satisfies a reliability threshold value associated with a reliability criterion and determining whether the first channel element utilization data satisfies a defined function with respect to the second channel element utilization data.

Further operations can include maintaining skip handover measurement data representative of measurements with respect to previous handovers that were requested and not performed, and machine learning the resource sufficiency criterion based on the skip handover measurement data. The skip handover measurement data can include at least one of: uplink signal-to-interference plus noise ratio data representative of uplink signal-to-interference plus noise ratios applicable to the previous handovers, control channel element utilization data representative respective utilizations of control channel elements of the previous handovers, or$ discontinuous transmission ratio data representative of discontinuous transmission ratios applicable to the previous handovers.

One or more example aspects, such as corresponding to example operations of a method, are represented in FIG. 10. Example operation 1002 represents reporting, by a mobile device comprising a processor, a handover event. Example operation 1004 represents receiving, by the mobile device in response to the reporting of the handover event, conditional handover criterion data indicative of a conditional handover criterion and candidate cell data indicative of candidate cells. Example operation 1006 represents monitoring, by the mobile device, mobile device state data indicative of a state of the mobile device. Example operation 1008 represents determining, by the mobile device, whether the mobile device state data violates the conditional handover criterion. Example operation 1010 represents, in response to the mobile device state data being determined not to violate the conditional handover criterion, skipping, by the mobile device, triggering of a handover operation notwithstanding the handover event. Example operation 1012 represents, in response to the mobile device state data being determined to violate the conditional handover criterion, triggering the handover operation responsive to the handover event to handover the mobile device to a candidate cell of the candidate cells based on the candidate cell data.

Monitoring the mobile device state data can include monitoring uplink transmission power data indicative of a transmission power applicable to an uplink of the mobile device, uplink buffer size data indicative of a buffer size applicable to the uplink of the mobile device, and discontinuous transmission data indicative of discontinuous transmission associated with the mobile device.

The conditional handover criterion data can include defined threshold power violation data indicative of a violation with respect to a defined threshold power, and determining whether the mobile device state data violates the conditional handover criterion can include determining that the uplink transmission power data satisfies the defined threshold power violation data and that the mobile device is violating the conditional handover criterion.

The conditional handover criterion can include defined uplink buffer size violation data indicative of a violation with respect to a defined threshold uplink buffer size, and determining whether the mobile device state data violates the conditional handover criterion data can include determining that the discontinuous transmission data satisfies the defined uplink buffer size violation data and that the mobile device is violating the conditional handover criterion.

The conditional handover criterion can include defined discontinuous transmission violation data indicative of a violation with respect to a defined threshold amount of discontinuous transmission, and determining whether the mobile device state data violates the conditional handover criterion data can include determining that the discontinuous transmission data satisfies the defined discontinuous transmission violation data and that the mobile device is violating the conditional handover criterion.

Further operations can include obtaining, by the mobile device, a physical downlink control channel communication, determining, by the mobile device based on total downlink assignment index data in the physical downlink control channel communication, whether the total downlink assignment index data matches a number of physical downlink control channel communications correctly received by the mobile device, and in response to the total downlink assignment index data matching the number, increasing a count representative of the discontinuous transmission data.

Figure 11:
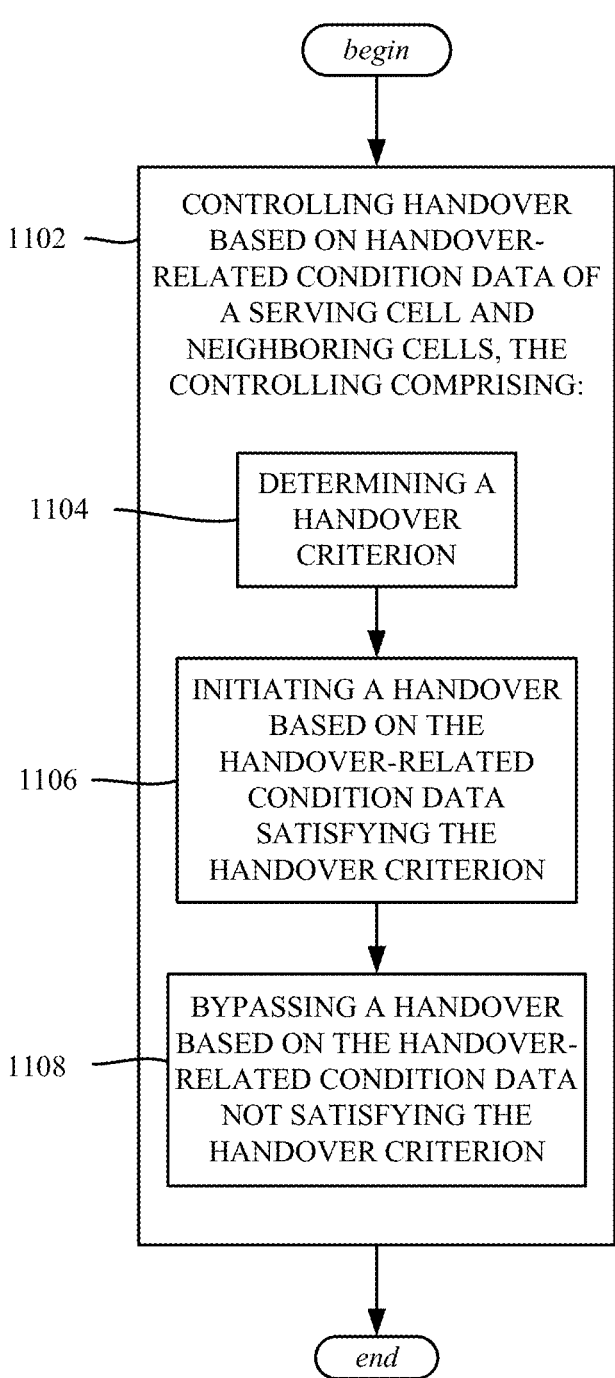
FIG. 11 is a flow diagram showing example operations related to controlling handover based on handover-related condition data of a serving cell and neighboring cells, in accordance with various aspects and implementations of the subject disclosure.

FIG. 11 summarizes various example operations, e.g., corresponding to a machine-readable medium, comprising executable instructions that, when executed by a processor, facilitate performance of operations. Example operation 1102 represents controlling handover based on handover-related condition data of a serving cell and neighboring cells. The controlling can include determining a handover criterion (example operation 1104), initiating a handover based on the handover-related condition data satisfying the handover criterion (example operation 1106), and bypassing a handover based on the handover-related condition data not satisfying the handover criterion (example operation 1108).

The handover-related condition data can include state data of the mobile device, and further operations can include sending handover criterion data representing the handover criterion to the mobile device for the mobile device to initiate the handover based on the state data satisfying the handover criterion, and for the mobile device to bypass the handover based on the state data not satisfying the handover criterion.

Further operations can include machine learning the handover criterion.

The handover-related condition data can include reliability data and first capacity data of a serving cell, second capacity data of a neighboring cell group, and uplink interference data of the neighboring cell group.

Controlling of the handover further can include determining whether to trigger the handover based on evaluating the handover criterion with respect to at least one of: the reliability data, the first capacity data, the second capacity data, or the uplink interference data, and, in response to a result of the determining being to initiate the handover, performing the initiating of the handover by communicating a trigger handover message to the serving cell, and, in response to the result of the determining being not to bypass the handover, communicating a bypass handover message to the serving cell.

As can be seen, the technology described herein facilitates an improved (e.g., URLLC) device quality of experience (QoE) during mobility, and thus supports private 5G (and beyond) deployments, such as a factory of the future. The technology described herein increases network spectral efficiency by reducing/minimizing handover overhead, and thus saves the resource expense of acquiring new spectrum. The technology described herein further can automate handover decisions through machine learning, thus reducing operational cost.

Figure 12:
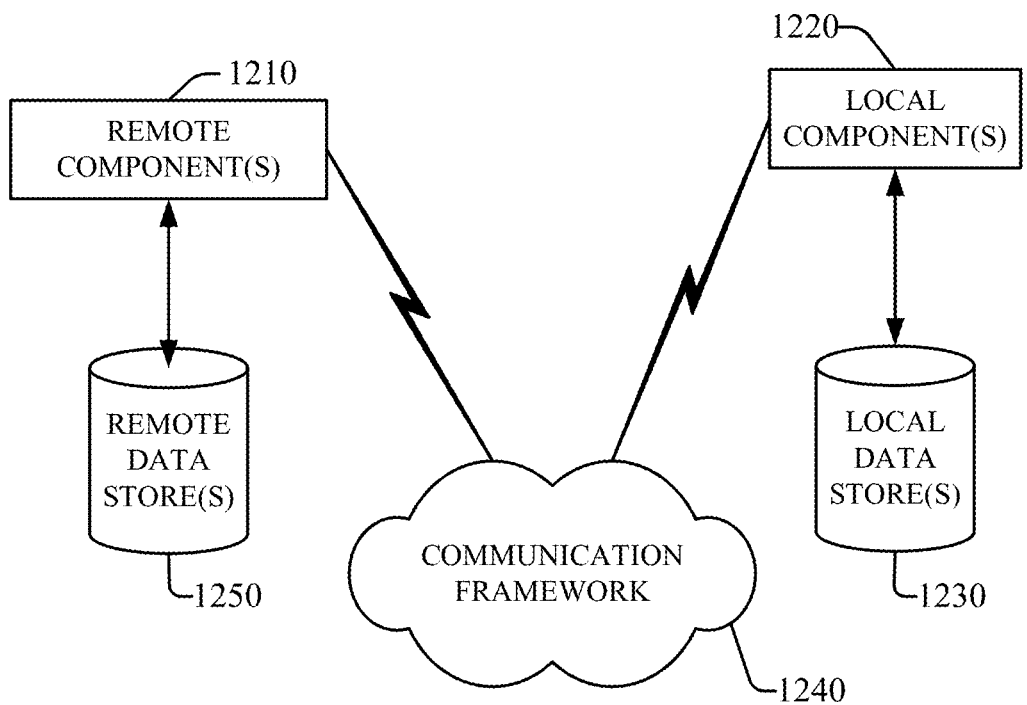
FIG. 12 is a block diagram representing an example computing environment into which aspects of the subject matter described herein may be incorporated.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
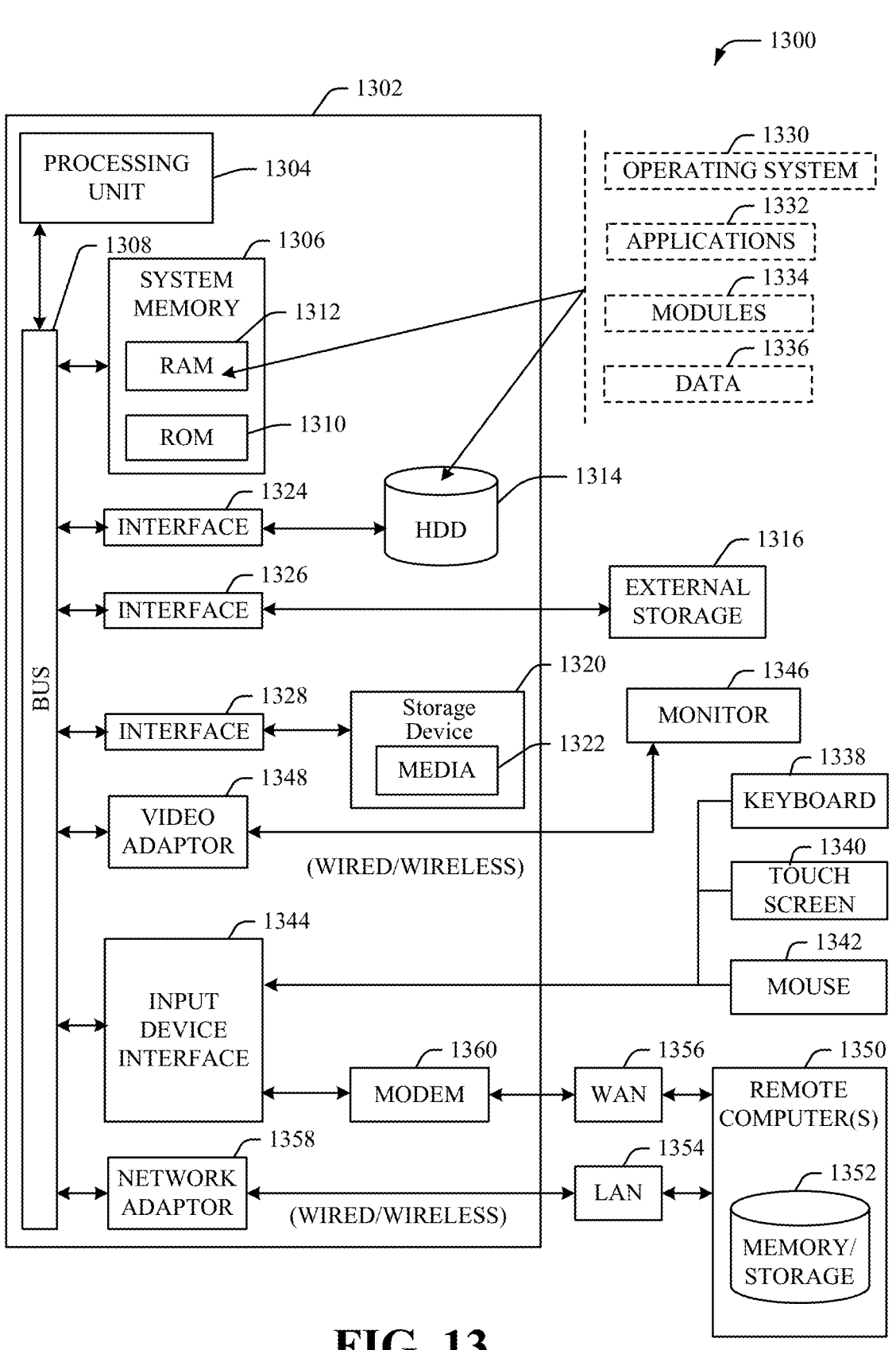
FIG. 13 depicts an example schematic block diagram of a computing environment with which the disclosed subject matter can interact/be implemented at least in part, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:

at least one processor; and at least one memory that stores executable instructions that, when executed by the at least one processor, facilitate performance of operations, the operations comprising:

monitoring uplink performance data representative of a performance of an uplink from a user equipment to a serving cell that is serving the user equipment and first control channel capacity data representative of a first capacity of a first control channel established between the serving cell and the user equipment;

monitoring second control channel capacity data representative of second capacities of control channels for respective neighboring cells of a neighboring cell group that is detected by the user equipment;

obtaining handover event data representative of a handover event based on the handover event data having been reported by the user equipment;

in response to obtaining the handover event data, determining, based on the first uplink performance data and first control channel capacity data, whether the serving cell has sufficient resources to satisfy a resource sufficiency criterion to communicate data traffic without violating packet delay specification data specifying a limit on packet delay;

maintaining skip handover measurement data representative of measurements with respect to previous handovers that were requested and not performed, and machine learning the resource sufficiency criterion based on the skip handover measurement data; and in response to the determining that the serving cell does not have sufficient resources to satisfy the resource sufficiency criterion, selecting, based on the second control channel capacity data, a neighboring cell of the neighboring cell group, resulting in a selected neighboring cell, and handing over the user equipment to the selected neighboring cell in a handover operation.

2. The system of claim 1, wherein the user equipment comprises an ultra- reliable low latency communications device.

3. The system of claim 1, wherein the network equipment comprises a radio access network intelligent controller.

4. The system of claim 1, wherein the operations further comprise, in response to the determining that the serving cell has sufficient resources to satisfy the resource sufficiency criterion, obtaining instantaneous uplink signal interference plus noise ratio data representative of instantaneous uplink signal interference plus noise ratios determined for the respective neighboring cells of the neighboring cell group;

obtaining time-averaged uplink signal interference plus noise ratio data representative of time-averaged uplink signal interference plus noise ratios determined for the respective neighbor cells of the neighboring cell group;

determining whether the instantaneous uplink signal interference plus noise ratio data of the respective neighbor cells of the neighboring cell group are equal to or greater than the time- averaged uplink signal interference plus noise ratio data of the respective neighbor cells; and in response to the instantaneous uplink signal interference plus noise ratio data of the respective neighbor cells of the neighboring cell group being determined to be greater than or equal to the time-averaged uplink signal interference plus noise ratio data of the respective neighbor cells, maintaining a connection the serving cell without performing the handover operation; and in response to the instantaneous uplink signal interference plus noise ratio data of the respective neighbor cells of the neighboring cell group being determined to be less than the time- averaged uplink signal interference plus noise ratio data of the respective neighbor cells, performing the selecting of the neighboring cell and the handing over of the user equipment to the selected neighboring cell in the handover operation.

5. The system of claim 1, wherein the first control channel capacity data comprises physical downlink control channel discontinuous transmission data representative of physical downlink control channel discontinuous transmission of the serving cell, and wherein the determining of whether the serving cell has sufficient resources to satisfy the resource sufficiency criterion comprises determining whether the physical downlink control channel discontinuous transmission data satisfies a reliability threshold value associated with a reliability criterion.

6. The system of claim 1, wherein the first control channel capacity data comprises first control channel element utilization data representative of a utilization of an element of the first control channel between the user equipment and the serving cell, wherein the second control channel capacity data comprises second control channel element utilization data representative of respective utilizations of elements of the second control channels of the respective neighboring cells of the neighboring cell group, and wherein the determining of whether the serving cell has sufficient resources to satisfy the resource sufficiency criterion comprises determining whether the first channel element utilization data satisfies a defined function with respect to the second channel element utilization data.

7. The system of claim 1, wherein the first control channel capacity data comprises physical downlink control channel discontinuous transmission data representative of physical downlink control channel discontinuous transmission of the serving cell and first control channel element utilization data representative of a utilization of an element of the first control channel between the user equipment and the serving cell, wherein the second control channel capacity data comprises second control channel element utilization data representative of respective utilizations of elements of the second control channels of the respective neighboring cells of the neighboring cell group, and wherein the determining of whether the serving cell has sufficient resources to satisfy the resource sufficiency criterion comprises determining whether the physical downlink control channel discontinuous transmission data satisfies a reliability threshold value associated with a reliability criterion and determining whether the first channel element utilization data satisfies a defined function with respect to the second channel element utilization data.

8. The system of claim 1, wherein the skip handover measurement data comprises at least one of: uplink signal-to-interference plus noise ratio data representative of uplink signal-to-interference plus noise ratios applicable to the previous handovers, control channel element utilization data representative respective utilizations of control channel elements of the previous handovers, or discontinuous transmission ratio data representative of discontinuous transmission ratios applicable to the previous handovers.

9. A method, comprising:

monitoring, by a system comprising at least one processor, uplink performance data representative of a performance of an uplink from a user equipment to a serving cell that is serving the user equipment and first control channel capacity data representative of a first capacity of a first control channel established between the serving cell and the user equipment;

monitoring, by the system, second control channel capacity data representative of second capacities of control channels for respective neighboring cells of a neighboring cell group that is detected by the user equipment;

obtaining, by the system, handover event data representative of a handover event based on the handover event data having been reported by the user equipment;

in response to obtaining the handover event data, determining, by the system and based on the first uplink performance data and first control channel capacity data, whether the serving cell has sufficient resources to satisfy a resource sufficiency criterion to communicate data traffic without violating packet delay specification data specifying a limit on packet delay;

maintaining, by the system, skip handover measurement data representative of measurements with respect to previous handovers that were requested and not performed, and machine learning the resource sufficiency criterion based on the skip handover measurement data; and in response to the determining that the serving cell does not have sufficient resources to satisfy the resource sufficiency criterion, selecting, by the system and based on the second control channel capacity data, a neighboring cell of the neighboring cell group, resulting in a selected neighboring cell, and handing over the user equipment to the selected neighboring cell in a handover operation.

10. The method of claim 9, wherein the user equipment comprises an ultra- reliable low latency communications device.

11. The method of claim 9, wherein the network equipment comprises a radio access network intelligent controller.

12. The method of claim 9, further comprising, in response to the determining that the serving cell has sufficient resources to satisfy the resource sufficiency criterion, obtaining, by the system, instantaneous uplink signal interference plus noise ratio data representative of instantaneous uplink signal interference plus noise ratios determined for the respective neighboring cells of the neighboring cell group;

obtaining, by the system, time-averaged uplink signal interference plus noise ratio data representative of time-averaged uplink signal interference plus noise ratios determined for the respective neighbor cells of the neighboring cell group;

determining, by the system, whether the instantaneous uplink signal interference plus noise ratio data of the respective neighbor cells of the neighboring cell group are equal to or greater than the time-averaged uplink signal interference plus noise ratio data of the respective neighbor cells; and in response to the instantaneous uplink signal interference plus noise ratio data of the respective neighbor cells of the neighboring cell group being determined to be greater than or equal to the time-averaged uplink signal interference plus noise ratio data of the respective neighbor cells, maintaining, by the system, a connection the serving cell without performing the handover operation; and in response to the instantaneous uplink signal interference plus noise ratio data of the respective neighbor cells of the neighboring cell group being determined to be less than the time-averaged uplink signal interference plus noise ratio data of the respective neighbor cells, performing, by the system, the selecting of the neighboring cell and the handing over of the user equipment to the selected neighboring cell in the handover operation.

13. The method of claim 9, wherein the first control channel capacity data comprises physical downlink control channel discontinuous transmission data representative of physical downlink control channel discontinuous transmission of the serving cell, and wherein the determining of whether the serving cell has sufficient resources to satisfy the resource sufficiency criterion comprises determining whether the physical downlink control channel discontinuous transmission data satisfies a reliability threshold value associated with a reliability criterion.

14. The method of claim 9, wherein the first control channel capacity data comprises first control channel element utilization data representative of a utilization of an element of the first control channel between the user equipment and the serving cell, wherein the second control channel capacity data comprises second control channel element utilization data representative of respective utilizations of elements of the second control channels of the respective neighboring cells of the neighboring cell group, and wherein the determining of whether the serving cell has sufficient resources to satisfy the resource sufficiency criterion comprises determining whether the first channel element utilization data satisfies a defined function with respect to the second channel element utilization data.

15. The method of claim 9, wherein the first control channel capacity data comprises physical downlink control channel discontinuous transmission data representative of physical downlink control channel discontinuous transmission of the serving cell and first control channel element utilization data representative of a utilization of an element of the first control channel between the user equipment and the serving cell, wherein the second control channel capacity data comprises second control channel element utilization data representative of respective utilizations of elements of the second control channels of the respective neighboring cells of the neighboring cell group, and wherein the determining of whether the serving cell has sufficient resources to satisfy the resource sufficiency criterion comprises determining whether the physical downlink control channel discontinuous transmission data satisfies a reliability threshold value associated with a reliability criterion and determining whether the first channel element utilization data satisfies a defined function with respect to the second channel element utilization data.

16. The method of claim 9, wherein the skip handover measurement data comprises at least one of: uplink signal-to-interference plus noise ratio data representative of uplink signal-to-interference plus noise ratios applicable to the previous handovers, control channel element utilization data representative respective utilizations of control channel elements of the previous handovers, or discontinuous transmission ratio data representative of discontinuous transmission ratios applicable to the previous handovers.

17. A non-transitory computer-readable medium comprising instructions that, in response to execution, cause a system comprising a processor to perform operations, comprising:

monitoring uplink performance data representative of a performance of an uplink from a user equipment to a serving cell that is serving the user equipment and first control channel capacity data representative of a first capacity of a first control channel established between the serving cell and the user equipment;

monitoring second control channel capacity data representative of second capacities of control channels for respective neighboring cells of a neighboring cell group that is detected by the user equipment;

obtaining handover event data representative of a handover event based on the handover event data having been reported by the user equipment;

in response to obtaining the handover event data, determining, based on the first uplink performance data and first control channel capacity data, whether the serving cell has sufficient resources to satisfy a resource sufficiency criterion to communicate data traffic without violating packet delay specification data specifying a limit on packet delay;

maintaining skip handover measurement data representative of measurements with respect to previous handovers that were requested and not performed, and machine learning the resource sufficiency criterion based on the skip handover measurement data; and in response to the determining that the serving cell does not have sufficient resources to satisfy the resource sufficiency criterion, selecting, based on the second control channel capacity data, a neighboring cell of the neighboring cell group, resulting in a selected neighboring cell, and handing over the user equipment to the selected neighboring cell in a handover operation.

18. The non-transitory computer-readable medium of claim 17, wherein the operations further comprise, in response to the determining that the serving cell has sufficient resources to satisfy the resource sufficiency criterion, obtaining instantaneous uplink signal interference plus noise ratio data representative of instantaneous uplink signal interference plus noise ratios determined for the respective neighboring cells of the neighboring cell group;

obtaining time-averaged uplink signal interference plus noise ratio data representative of time-averaged uplink signal interference plus noise ratios determined for the respective neighbor cells of the neighboring cell group;

determining whether the instantaneous uplink signal interference plus noise ratio data of the respective neighbor cells of the neighboring cell group are equal to or greater than the time-averaged uplink signal interference plus noise ratio data of the respective neighbor cells; and in response to the instantaneous uplink signal interference plus noise ratio data of the respective neighbor cells of the neighboring cell group being determined to be greater than or equal to the time-averaged uplink signal interference plus noise ratio data of the respective neighbor cells, maintaining a connection the serving cell without performing the handover operation; and in response to the instantaneous uplink signal interference plus noise ratio data of the respective neighbor cells of the neighboring cell group being determined to be less than the time-averaged uplink signal interference plus noise ratio data of the respective neighbor cells, performing the selecting of the neighboring cell and the handing over of the user equipment to the selected neighboring cell in the handover operation.

19. The non-transitory computer-readable medium of claim 17, wherein the skip handover measurement data comprises at least one of: uplink signal-to-interference plus noise ratio data representative of uplink signal-to-interference plus noise ratios applicable to the previous handovers, control channel element utilization data representative respective utilizations of control channel elements of the previous handovers, or discontinuous transmission ratio data representative of discontinuous transmission ratios applicable to the previous handovers.

20. The non-transitory computer-readable medium of claim 17, wherein the user equipment comprises an ultra-reliable low latency communications device, or a radio access network intelligent controller.

* * * * *